US007953690B2

(12) United States Patent
Luo et al.

(10) Patent No.: US 7,953,690 B2
(45) Date of Patent: May 31, 2011

(54) DISCOVERING SOCIAL RELATIONSHIPS FROM PERSONAL PHOTO COLLECTIONS

(75) Inventors: Jiebo Luo, Pittsford, NY (US); Parag Singla, Seattle, WA (US); Henry Kautz, Rochester, NY (US); Andrew C. Gallagher, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 684 days.

(21) Appl. No.: 12/020,141

(22) Filed: Jan. 25, 2008

(65) Prior Publication Data

US 2009/0192967 A1 Jul. 30, 2009

(51) Int. Cl.
*G06N 5/02* (2006.01)
(52) U.S. Cl. .............................. 706/47; 706/12; 348/143
(58) Field of Classification Search .................... 706/12, 706/47; 348/143; 704/9
See application file for complete search history.

(56) References Cited

U.S. PATENT DOCUMENTS

2006/0045352 A1 3/2006 Gallagher
2009/0153661 A1* 6/2009 Cheng et al. .................. 348/143

OTHER PUBLICATIONS

Luo et al., Semantic Retrieval of Multimedia: Pictures are not taken in a vacuum, IEEE Signal Processing Machine (101) Mar. 2006, pp. 1-14.*
"Markov Logic Networks"; by M. Richardon and P. Domingos, Machine Learning, 62:107-136, pp. 1-43, Jan. 26, 2006. [URL: http://www.cs.washington.edu/homes/pedrod/kbmn.pdf].

"Toward Automatic Simulation of Aging Effects on Face Images"; by A. Lanitis, C. J. Taylor, and T. F. Cootes; PAMI, 2002 IEEE Transactions on Patter Analysis and Machine Intelligence; vol. 24, No. 4, pp. 442-455, Apr. 2002. [URL: http://ieeexplore.ieee.org/application/enterprise/entconfirmation.jsp?arnumber=993553].
"Learning from Facial Aging Patterns for Automatic Age Estimation"; by X. Geng, Z-H. Zhou, Y. Zhang, G. Li, and H. Dai; in proceedings of ACM Multimedia, 2006. [URL: http://cs.nju.edu.cn/zhouzh/zhouzh.files/publication/mm06.pdf].
"Gender Classification with Support Vector Machines"; by B. Moghaddam and M-H. Yang; MERL-A Mitsubishi Electric Research Laboratory; Proceedings of ICPR, TR-2000-01, Jan. 2000. [URL: http://www.merl.com/publications/TR2000-001].
"Boosting Sex Identification Performance"; by S. Baluja and H. A. Rowley; International Journal of Computer Vision 71(1), pp. 111-119, 2007. [URL: http://www.springerlink.com/content/p592737w4811w117/fulltext.pdf].
"Eigenfaces vs. Fisherfaces: Recognition Using Class Specific Linear Projection"; by P. N. Belhumeur, J. P. Hespanha, and D. J. Kriegman, IEEE Trans. On PAMI, Jul. 1997. [URL: http://www1.cs.columbia.edu/~belhumeur/pub/papers-uncompressed/pamifaces.pdf].
"Active Shape Models—Their Training and Application"; by T. F. Cootes, C. J. Taylor; D. H. Cooper, and J. Graham, Computer Vision and Image Understanding, vol. 61, No. 1, pp. 38-59, Jan. 1995. [URL: http://biometrics.cse.msu.edu/PRIPSeminar/ActiveShape/95CootesActiveShape.pdf].

(Continued)

*Primary Examiner* — Donald Sparks
*Assistant Examiner* — Ola Olude-Afolabi
(74) *Attorney, Agent, or Firm* — Raymond L. Owens

(57) ABSTRACT

A method of categorizing the relationship of individuals from a collection of photos taken in multiple sets of events includes: searching the photo collection to identify individuals in the photo collection, determining the gender and age range of the identified individuals; and using the identified individuals, their occurrences and co-occurrences, their gender, and their ages to infer social relationships between the individuals based on a set of rules.

12 Claims, 4 Drawing Sheets

40

42

| Person | Relation |
|--------|----------|
| Andy | Parent (father) |
| Jonathan | (young) Son |
| Holly | Parent (mother) |
| Hannah | (young) Daughter |

OTHER PUBLICATIONS

"Efficient Weight Learning for Markov Logic Networks"; by D. Lowd and P. Domingos, Proc. PKDD-07, pp. 200-211; Warsaw, Poland: Springer. [URL: http://www.cs.washington.edu/homes/pedrod/papers/pkdd07.pdf].

"Learning the Structure of Markov Logic Networks"; by S. Kok and P. Domingos; Proceedings of ICML-05, pp. 441-448; Bonn, Germany: ACM Press. [URL: http://www.cs.washington.edu/homes/pedrod/papers/mlc05a.pdf].

Parag Singla et al.: "Discovery of Social Relationships in Consumer Photo Collections Using Markov Logic", Computer Vision and Pattern Recognition Workshops, 2008, CVPR Workshops 2008, IEEE Computer Society Conference on, IEEE, Piscataway, NJ, USA, Jun. 23, 2008, pp. 1-7, XP031285603, ISBN: 978-1-4244-2339-2.

Matthew Richardson et al.: "Markov Logic Networks", Jan. 27, 2006, Machine Learning, Kluwer Academic Publishers-Plenum Publishers, NE, pp. 107-136, XP019403035, ISSN: 1573-0565.

Chung-Yi Weng et al.: "Rolenet: Treat a Movie as a Small Society", MIR' 07: Proceedings of the International Workshop on Multimedia Information. Retrieval, Dec. 31, 2007, pp. 51-60, XP002523404, New York, USA.

Andrew C. Gallagher et al.: "Using a Markov Network to Recognize People in Consumer Images", Image Processing, 2007, ICIP 2007, IEEE International Conference on, IEEE, PI, Sep. 1, 2007, pp. IV-489, XP031158762, ISBN: 978-1-4244-1436-9.

Jiebo Luo et al.: "Pictures Are Not Taken In A Vacumn", IEEE Signal Processing Magazine, Mar. 31, 2006, pp. 101-114, XP002523405.

* cited by examiner

| Person | Relationship | Age | Sex |
|---|---|---|---|
| 1. Hannah | Daughter | 5 | F |
| 2. Jonah | Son | 3 | M |
| 3. Renee | Sister | 35 | F |
| 4. Holly | Spouse | 29 | F |
| 5. Andy | It's me!! | 33 | M |
| 6. Margaret | Sister-in-law | 24 | F |
| 7. Sarah | Friend | 30 | F |

*FIG. 3*

DISCOVERING SOCIAL RELATIONSHIPS FROM PERSONAL PHOTO COLLECTIONS

FIELD OF THE INVENTION

The present invention is related to artificial intelligence and machine learning, and in particular to discovering social relationships from personal photo collections.

BACKGROUND OF THE INVENTION

Consumer photo collections are all pervasive. Mining semantically meaningful information from such collections has been an area of active research in machine learning and computer vision communities. There is a large body of work focusing on problems of object recognition, detecting objects of certain types such as faces, cars, grass, water, sky, and so on. Most of this work relies on using low level vision features (such as color, texture and lines) available in the image. In the recent years, there has been an increasing focus on extracting semantically more complex information such as scene detection and activity recognition. For example, one might want to cluster pictures based on if they were taken outdoors or indoors, or separate work pictures from leisure pictures. Solution to such problems primarily relies on using the derived features such as people present in the image, presence or absence of certain kinds of objects in the image and so on. Typically, power of collective inference is used in such scenarios. For example, it may be difficult to tell for a particular picture if it is work or leisure, but looking at other pictures which are similar in location and time, it might become easier to make the same prediction. This line of research aims to revolutionize the way people perceive the digital photo collection—from a bunch of pixel values to highly complex and meaningful objects which can be queried for information or automatically organized in ways which are meaningful to the user.

Taking semantic understanding a step further, humans have the ability to infer the relationships between people appearing in the same picture after observing a sufficient number of pictures: are they families' members, friends, just acquaintances, or merely strangers who happen to be in the same place at the same time. In other words, consumer photos are usually not taken in coincidence with strangers but often with friends and families. Detecting or predicting such relationships can be an important step towards building intelligent cameras as well as intelligent image management systems.

SUMMARY OF THE INVENTION

In accordance with an aspect of the present invention, there is provided a method of categorizing the relationship of individuals from a collection of photos taken in multiple sets of events, comprising:
  a. searching the photo collection to identify individuals in the photo collection, and determining the gender and age range of the identified individuals; and
  b. using the identified individuals, their occurrences and co-occurrences, their gender, and their ages to infer social relationships between the individuals based on a set of rules.

In accordance with another aspect of the present invention, there is provided a method of categorizing the relationship between individuals in a collection of photos and a photographer of the photos, comprising:
  a. searching the photo collection to identify individuals in the photo collection, and determining the gender and age range of the identified individuals; and
  b. using the identified individuals, their occurrences and co-occurrences, their gender, and their ages to infer social relationships between the individuals and the photographer based on a set of rules.

Features and advantages of the present invention include using a collection of personal images associated with the personal identity, age, and gender information to automatically discover the type of social relationships between the individuals appearing in the personal images.

BRIEF DESCRIPTION OF THE DRAWINGS

FIG. 3 is a table showing the ontological structure of social relationship types.

DETAILED DESCRIPTION OF THE INVENTION

Figure 1:
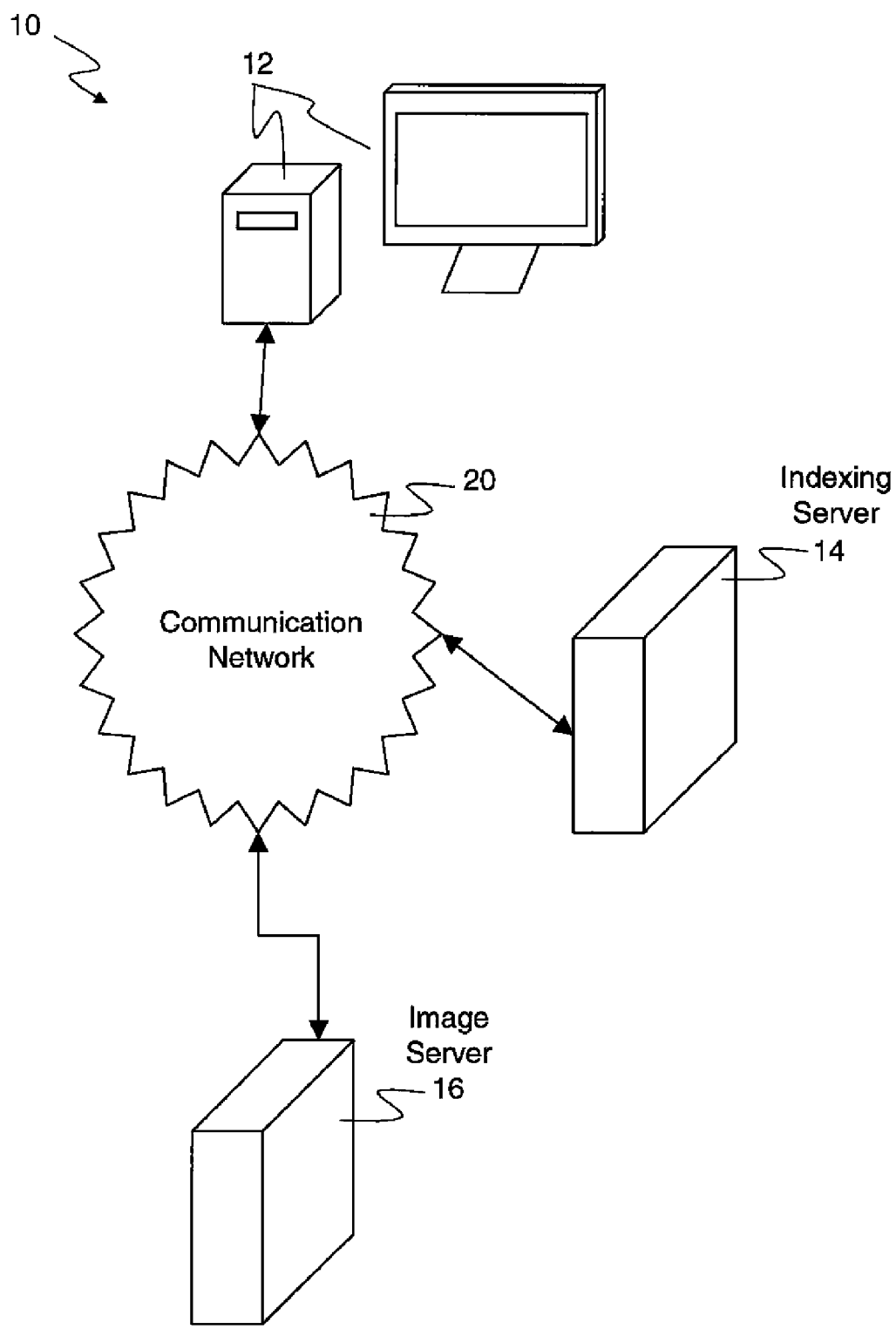
FIG. 1 is pictorial of a system that makes use of the present invention.

The present invention is a means to automatically detect social relationships in consumer photo collections. For example, given two faces appearing in an image, one would like to be able to infer they are spouse of each other as opposed to simply being friends. Even in the presence of additional information about age, gender and identity of various faces, this task seems extremely difficult. What information can a picture have in order to distinguish between friends vs spouse relationship? But when a group of related pictures is looked at collectively, this task becomes more tractable. In particular, a third party person (other than the subject in the picture and the photographer) can have a good guess for above task based on the rules of thumb such as: a) couples often tend to be photographed just by themselves as opposed to friends who typically appear in groups, and b) couples with young kids often appear with their kids in the photos. The beauty of this approach is that one can even say meaningful things about relationships between people who never (or very rarely) are photographed together in a given collection. For example, if A (male) appears with a kid in bunch of photos and B (female) appears with the same kid in other photos, and A and B appear together in a few other photos, then most likely they share spouse relationship and are the parents of the kid being photographed with them. Furthermore, the social relationship between the individuals in the photos and the photographer can be inferred in a similar fashion.

The present invention captures the rules of thumb as described above in a meaningful way. There are a few key issues that need to be taken into account when establishing such rules:
  a) these are rules of thumb after all and thus may not always be correct.
  b) many rules may fire at the same time and they need to be carefully combined.
  c) multiple rules may conflict with each other in certain scenarios.

A good method to handle these issues is Markov Logic (Richardson & Domingos 2006, Markov logic networks. Machine Learning 62:107-136, 2006) which provides a framework to combine first order logic rules in a mathematically sound way. Each rule is seen as a soft constraint (as opposed to a hard constraint in logic) whose importance is determined by the real valued weight associated with it. Higher the weight is, more important the rule is. In other words, given two conflicting rules, the rule with higher weight should be believed with the greater confidence, other things being equal. Weights can be learned from training data. Further, Markov logic also provides the power to learn new rules using the data, in addition to the rules supplied by the domain experts, thereby enhancing the background knowledge. These learned rules (and their weights) are then used to perform a collective inference over the set of possible relationships. As will be described later, one can also a build a collective model over predicting relationships, age and gender, using noisy predictors (for age and gender) as inputs to the system. Predicting one component helps predict the other and vice-versa. For example, recognizing that two people are of same gender helps eliminate the spouse relationship and vice-versa. Inference done over one picture is carried over to other pictures, thereby improving the overall accuracy.

Statistical relational models combine the power of relational languages such as first order logic and probabilistic models such as Markov networks. This provides the capability to explicitly model the relations in the domain (for example various social relationship in our case) and also explicitly take uncertainty (for example, rules of thumb may not always be correct) into account. There has been a large body of research in this area in the recent years. One of the most powerful such model is Markov logic (Richardson & Domingos 2006). It combines the power of first order logic with Markov networks to define a distribution over the properties of underlying objects (e.g. age, gender, facial features in our domain) and relations (e.g. various social relationships in our domain) among them. This is achieved by a attaching a real valued weight to each formula in a first order theory, where the weight (roughly) represents the importance of the formula. Formally, a Markov Logic Network L is defined as a set of pairs (Fi,wi), Fi being a formula in first order logic and wi a real number. Given a set of constants C, the probability of a particular configuration x of the set of ground predicates X is given as $$P(X = x) = \frac{1}{Z}\exp\left(\sum_{i=1}^{m} w_i n_i(x)\right)$$

where the sum is over all the formulas appearing in L, wi is the weight of the ith formula and ni(x) is the number of its true groundings under the assignment x. Z is the normalization constant. For further details, see Richardson & Domingos 2006.

In FIG. 1, system 10 is shown with the elements necessary to practice the current invention including computing device 12, indexing server 14, image server 16, and communications network 20. Computing device 12 can be a personal computer for storing images where images will be understood to include both still and moving or video images. Computing device 12 communicates with a variety of devices such as digital cameras or cell phone cameras (not shown) for the purpose of storing images captured by these devices. These captured images can further include personal identity information such as names of the persons in the image by the capturing device (by either voice annotation or in-camera tagging). Computing device 12 can also communicate through communications network 20 to an internet service that uses images captured without identity information and allows the user or a trained automatic algorithm to add personal identity information to the images. In either case, images with personal identity information are well known in the art.

Indexing server 14 is another computer processing device available on communications network 20 for the purposes of executing the algorithms in the form of computer instructions that analyze the content of images for semantic information such as personal identity, age and gender, and social relationships. It will be understood that providing this functionality in system 10 as a web service via indexing server 14 is not a limitation of the invention. Computing device 12 can also be configured to execute the algorithms responsible for the analysis of images provided for indexing.

Image server 16 communicates with other computing devices via communications network 20 and upon request, image server 16 provides a snapshot photographic image that may contain no person, one person or a number of persons. Photographic images stored on image server 16 are captured by a variety of devices, including digital cameras and cell phones with built-in cameras. Such images may also already contain personal identity information obtained either at or after the original capture by manual or automatic means.

Figure 2:
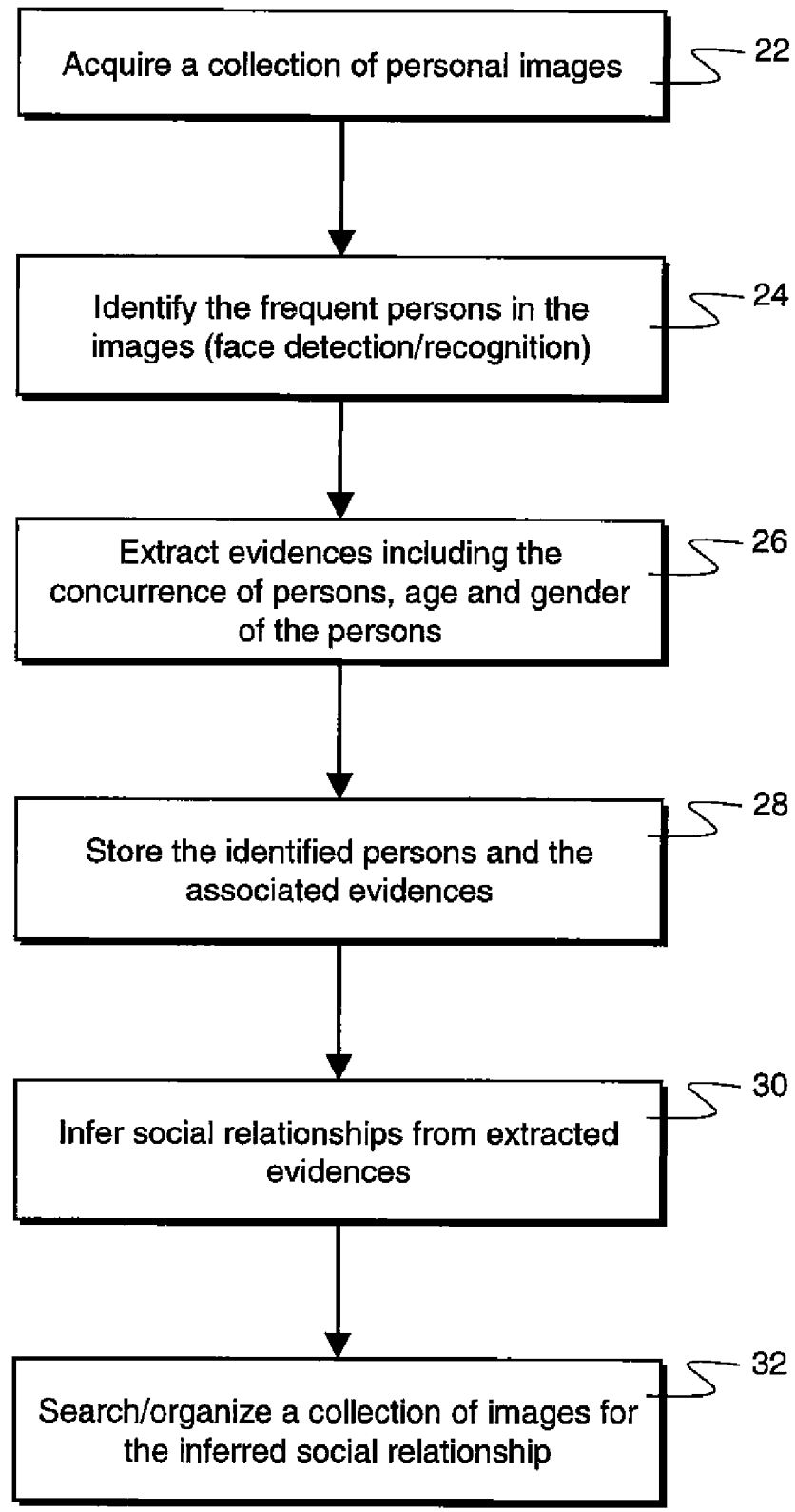
FIG. 2 is a flow chart for practicing an embodiment of the invention.

In FIG. 2, a process diagram is illustrated showing the sequence of steps necessary to practice the invention. In step 22, a collection of personal images is acquired that contain a plurality of persons potentially socially related. The personal identity information is preferably associated with the image in the form of metadata, but can be merely supplied in association with the image without deviating from the scope of the invention. The image can be provided by computing device 12 from its internal storage or from any storage device or system accessible by computing device 12 such as a local network storage device or an online image storage site. If personal identity information is not available, using the collection of images provided in step 22, computing device 12 provides the personal identity information to indexing server 14 in step 24 to acquire personal identity information associated each of the images, either through automatic face detection and face recognition, or manual annotation.

Using the acquired photographic image of step 24, computing device 12 extracts evidences including the concurrence of persons, age and gender of the persons in each image in step 26 using classifiers in the following manner. Facial age classifiers are well known in the field, for example, A. Lanitis, C. Taylor, and T. Cootes, "Toward automatic simulation of aging effects on face images," PAMI, 2002, and X. Geng, Z. H. Zhou, Y. Zhang, G. Li, and H. Dai, "Learning from facial aging patterns for automatic age estimation," in proceedings of ACM MULTIMEDIA, 2006, and A. Gallagher in U.S. Patent Application 20060045352. Gender can also be estimated from a facial image, as described in M. H. Yang and B. Moghaddam, "Support vector machines for visual gender classification," in Proceedings of ICPR, 2000, and S. Baluja and H. Rowley, "Boosting sex identification performance," in International Journal of Computer Vision, 2007.

In a preferred embodiment of the present invention, for age classification, the image collections from three consumers are acquired, and the individuals in each image are labeled, for a total of 117 unique individuals. The birth year of each individual is known or estimated by the collection owner. Using the image capture date from the EXIF information and the individual birthdates, the age of each person in each image is computed. This results in an independent training set of 2855 faces with corresponding ground truth ages. Each face is normalized in scale (49×61 pixels) and projected onto a set of Fisherfaces (as described by P. N. Belhumeur, J. Hespanha, and D. J. Kriegman. Eigenfaces vs. Fisherfaces: Recognition using class specific linear projection. *PAMI*, 1997.) The age estimate for a new query face is found by normalizing its scale, projecting onto the set of Fisherfaces, and finding the nearest neighbors (e.g., 25) in the projection space. The estimated age of the query face is the median of the ages of these nearest neighbors. For estimating gender, a face gender classifier using a support vector machine is implemented. The feature dimensionality is reduced by first extracting facial features using an Active Shape Model (T. Cootes, C. Taylor, D. Cooper, and J. Graham. Active shape models—their training and application. *CVIU*, 1995.). A training set of 3546 faces is used to learn a support vector machine which outputs probabilistic density estimates.

The identified persons and the associated evidences are then stored in step 28 for each image in the collection in preparation for the inference task. The computing device 12 or the indexing server 12 can perform the inference task depending on the scale of the task. In step 30, the social relationships associated with the persons found in the personal image collection, or the social relationships between the persons found in the photos and the photographer who took the photos, or both, are inferred from the extracted evidences. Note that the photographer (or in a broader sense the assumed owner of the photo collection) usually does not appear in the photo, unless the timer mode in the camera was used or someone else was asked to press the shutter. Finally, having inferred the social relationship of the persons in a personal image collection allows computing device 12 to organize or search the collection of images for the inferred social relationship in step 32. Such a process can be executed in an incremental manner such that new images, new individuals, and new relationships can be properly handled. Furthermore, this process can be used to track the evolution of individuals in terms of changing appearances and social relationships in terms of expansion, e.g., new family members and new friends.

In a preferred embodiment of the present invention, in step 30, the model, i.e., the collection of social relationship rules predictable from personal photo collections is expressed in Markov logic. The following describes the concerned objects of interest, predicates (properties of objects and the relationships among them), and the rules which impose certain constraints over those predicates. Later on, descriptions are provided for the learning and inference tasks.

FIG. 3 is a table showing the ontological structure 35 of social relationship types (relative to the assumed owner of the personal image collection). The general relationships between subjects in the images are defined similarly. More arbitrary relationships between arbitrary individuals can be defined without deviating from the essence of the present invention.

Figure 4A:
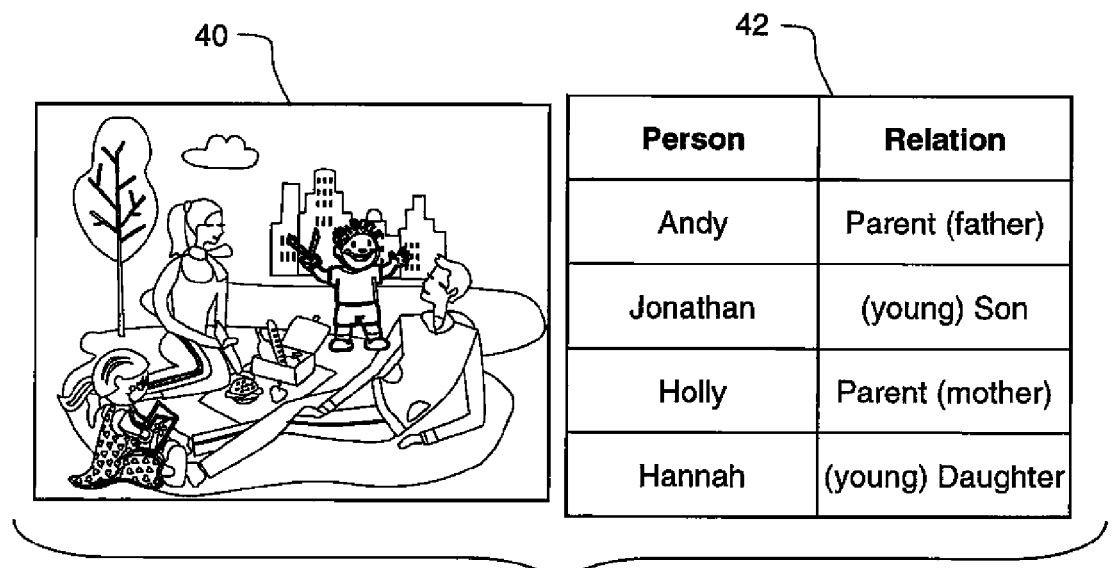
FIGS. 4a and 4b respectively depict examples of images and the corresponding social relationships inferred from the images. In particular, relationships between the individuals in the image are discovered in FIG. 4a, while the relationships between the individuals in the image and photographer are discovered in FIG. 4b.
Figure 4B:
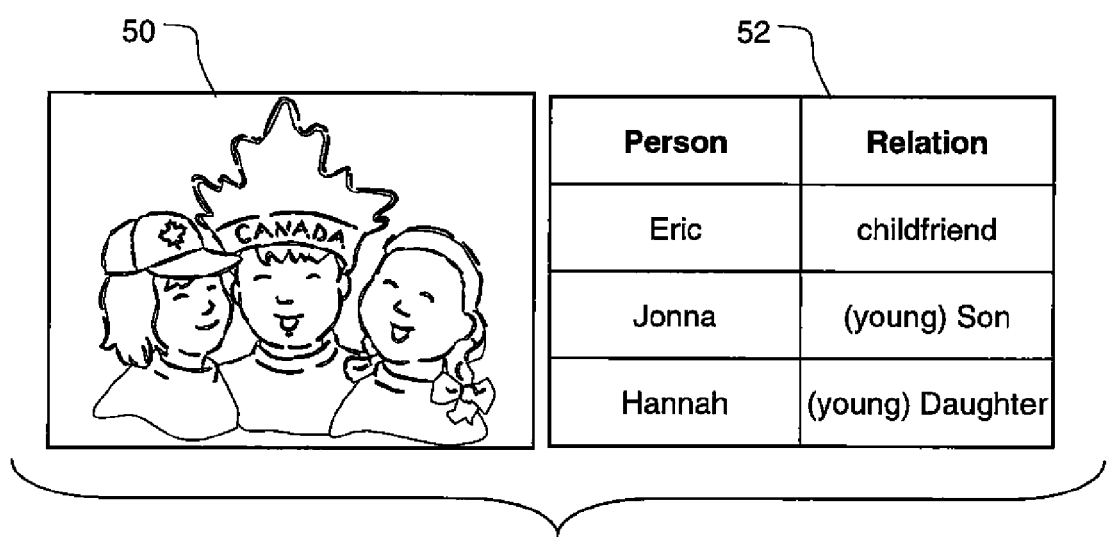

FIGS. 4*a* and 4*b* depict examples of personal photographic images (40 and 50) and the corresponding social relationships (42 and 52) inferred from the images. In particular, relationships between the individuals in the image are discovered in FIG. 4*a*, while the relationships between the individuals in the image and photographer are discovered in FIG. 4*b*.

The following provides more details on the preferred embodiment of the present invention. There are three kinds of objects in the domain of the present invention:

Person: A real person in the world.
Face: A specific appearance of a face in an image.
Image: An image in the collection.

Two kinds of predicates are defined over the objects of interest. The value of these predicates is known at the time of the inference through the data. An example evidence predicate would be, OccursIn(face,img) which describes the truth value of whether a particular face appears in a given image or not. We use the evidence predicates for the following properties/relations:

Number of people in an image: HasCount(img,cnt)
The age of a face appearing in an image: HasAge(face,age)
The gender of a face appearing in an image: HasGender (face, gender)
Whether a particular face appears in an image: OccursIn (face, img)
Correspondence between a person and his/her face: HasFace(person, face)

The age (gender) of a face is the estimated age (gender) value associated with a face appearing in an image. This is different from the actual age (gender) of a person which is modeled as a query predicate. The age (gender) associated with a face is inferred from a model trained separately on a collection of faces using various facial features as previously described. Note that different faces associated with the same person may have different age/gender values, because of estimation errors due to difference in appearances, time difference in when the pictures were taken. We model the age using 5 discrete bins: child, teen, youth, middle-aged and senior.

In the present invention application, it is assumed that face detection and face recognition have been done before hand by either automatic or manual means. Therefore, we know exactly which face corresponds to which person. Relaxing this assumption and folding algorithmic face detection and face recognition as part of the model is a natural extension that can be handled properly by the same Markov logic-based model and the associated inference method.

The value of these predicates is not known at the time of the inference and needs to be inferred. Example of this kind of predicates is, HasRelation(person1, person2, relation) which describes the truth value of whether two persons share a given relationship. The following query predicates are used:

Age of a person: HasAge(person, age)
Gender of a person: HasGender(person, gender)
The relationship between two persons: HasRelation(person1, person2, relation)

A preferred embodiment of the present invention models seven different kinds of social relationships: relative, friend, acquaintance, child, parent, spouse, childfriend. Relative includes any blood relatives not covered by parents/child relationship. Friends are people who are not blood relatives and satisfy the intuitive definition of friendship relation. Any non-relatives, non-friends are modeled as acquaintances. Childfriend models the friends of children. It is important to model the childfriend relationship, as the kids are pervasive in consumer photo collections and often appear with their friends. In such scenarios, it becomes important to distinguish between children and their friends.

There are two kinds of rules: hard rules and soft rules. All the rules are expressed as formulas in first order logic.

Hard rules describe the hard constraints in the domain, i.e., they should always hold true. An example of a hard rule is OccursIn(face, img1) and OccursIn(face, img2)→(img1=img2), which is simply stating that each face occurs in at most one image in the collection.

Parents are older than their children.
Spouses have opposite gender.
Two people share a unique relationship among them.

Note that in the present invention there is a unique relationship between two people. Relaxing this assumption (e.g. two people can be relatives (say cousins) as well friends) can be an extension of the current model.

Soft rules describe the more interesting set of constraints—we believe them to be true most of the times but they may not always hold. An example of a soft rule is OccursIn(person1, img) and OccursIn(person2, img)→!HasRelation(person1, person2, acquaintance). This rule states that two people who occur together in a picture are less likely to be mere acquaintances. Each additional instance of their occurring together (co-occurrence in different pictures) further decreases this likelihood. Here are some of the other soft rules used in the present invention:

Children and their friends are of similar age.

A young adult occurring solely with a kid shares the parent/child relationship.

Two people of similar age and opposite gender appearing together (by themselves) share spouse relationship.

Friends and relatives are clustered across photos: if two friends appear together a photo, then a third person occurring in the same photo is more likely to be a friend. Same holds for relatives.

In general, one would prefer a solution which would satisfy all the hard constraints (presumably such a solution always exists) at the same time, satisfying maximal number (weighted) of soft constraints. In general, the sets of rules apply to the relationships between individuals in the images (i.e., subjects) as well as the relationships between the photographer and the subjects. One example of additional rules specific to the relationships between the photographer (or the assumed owner of the photo collection) and the subjects is:

The child(ren) with the highest occurrence in a photo collection is(are) the child(ren) of the photographer.

Finally, there is a rule consisting of a singleton predicate HasRelation(person1, person2, +relation) (+ means that we learn a different weight for each relation) which can be thought of representing the prior probability of a particular relationship holding between any two random people in the collection. For example, it would be much more likely to have a friends relationship as compared to the parents or child relationship. Similarly, there are the singleton rules HasAge (person, +age and HasGender(person, +gender). These represent (intuitively) the prior probabilities of having a particular age and gender, respectively. For example, it is easy to capture the fact that children tend to be photographed more often by giving a high weight to the rule HasAge(person, child).

Given the model (the rules and their weights), inference corresponds to finding the marginal probability of query predicates HasRelation, HasGender and HasAge given all the evidence predicates. Because of the need to handle a combination of hard (deterministic) and soft constraints, the MC-SAT algorithm of Poon & Domingos (see Poon & Domingos, Sound and efficient with probabilistic and deterministic dependencies. Proceedings of AAAI-06, 458-463. Boston, Mass.: AAAI Press.) is used in a preferred embodiment of the present invention.

Given the hard and soft constraints, learning corresponds to finding the preferred weights for each of the soft constraints. First, the MAP weights are set with a Gaussian prior centered at zero. Next, the learner of Lowd & Domingos is employed (Lowd & Domingos. Efficient weight learning for Markov logic networks. In Proc. PKDD-07, 200-211. Warsaw, Poland: Springer.). The structure learning algorithm of Kok & Domingos is used (Kok & Domingos, Learning the structure of Markov logic networks. Proceedings of. ICML-05, 441-448. Bonn, Germany: ACM Press.) to refine (and learn new instances) of the rules which help predict the target relationships. The original algorithm as described by them does not allow the discovery of partially grounded clauses. This is important for the present invention as there is a need to learn the different rules for different relationships. The rules may also differ for specific age groups (such as kids) or gender (for example, one can imagine that males and females differ in terms of whom they tend to be photographed in their social circles). The change needed in the algorithm to have this feature is straightforward: the addition of all possible partial groundings of a predicate is allowed during the search for the extensions of a clause. Only certain variables (i.e. relationship, age and gender) are allowed to be grounded in these predicates to avoid blowing up the search space. Rest of the algorithm proceeds as described previously.

The invention has been described in detail with particular reference to certain preferred embodiments thereof, but it will be understood that variations and modifications can be effected within the spirit and scope of the invention.

PARTS LIST 10 current system
12 computing device
14 indexing server
16 image server
20 communications network
22 step—(acquiring a collection of personal images)
24 step—(identifying the frequent persons in the images (face detection/recognition))
26 step—(Extracting evidences including the concurrence of persons, age and gender of the persons)
28 step (Storing the identified persons and the associated evidences)
30 step—(Inferring social relationships from extracted evidences)
32 step (Search/organize a collection of images for the inferred social relationship)
35 ontological structure of social relationship types
40 example image
42 example relationships
50 example image
52 example relationships

The invention claimed is:

1. A method of categorizing the relationship of individuals from a collection of photos taken in multiple sets of events, comprising using a computer for automatically performing the following steps:
   a. searching the photo collection to identify individuals in the photo collection, and determining the gender and age range of the identified individuals;
   b. determining occurrences of identified individuals and co-occurrences of identified individuals; and
   c. performing an inference task using the identified individuals, their occurrences and co-occurrences, their gender, and their age ranges to determine a type of social relationship relationships between a pair of individuals, wherein the types of social relationships include parent, child, spouse, other relative, friend, child's friend, or acquaintance.

2. The method of claim 1 wherein step c wherein the inference task includes using a set of rules including at least one of the following hard rules:
   i. parents are older than their children; and
   ii. spouses are of opposite gender.

3. The method of claim 2 wherein the set of rules further includes at least one of the following soft rules:
- iii. parents and grandparents appear with their children or grandchildren;
- iv. friends and relatives are clustered across photos;
- v. an acquaintance appears in fewer images than relatives and friends; and
- vi. people with closer relationships appear closer in photos than those who do not have a close relationship.

4. The method of claim 1 wherein the inference is performed using a Markov Logic Network (MLN).

5. The method of claim 1 further comprising one or more of the following:
- d. adding additional new images to the image collection; or
- e. identifying new individuals in the new images.

6. The method of claim 5 further including
- f. using the identified new individuals, their occurrences and co-occurrences, their gender, and their ages to infer social relationships between the new individuals and the identified individuals based on the set of rules.

7. A method of categorizing the relationship of individuals from a collection of photos taken in multiple sets of events and belonging to an assumed owner, comprising using a computer for automatically performing the following steps:
- a. searching the photo collection to identify individuals in the photo collection, and determining the gender and age range of the identified individuals; and
- b. determining occurrences of identified individuals and co-occurrences of identified individuals; and
- c. performing an inference task using the identified individuals, their occurrences and co-occurrences, their gender, and their age ranges to determine a type of social relationship between the individuals and the assumed owner of the photo collection, wherein the types of social relationships include parent, child, spouse, other relative, friend, child's friend, or acquaintance.

8. The method of claim 7 wherein step c wherein the inference task includes using a set of rules including at least one of the following hard rules:
- i. parents are older than their children; and
- ii. spouses are of opposite gender.

9. The method of claim 7 wherein the set of rules further includes at least one of the following soft rules:
- iii. children of an assumed owner of the photo collection, occur more frequently in the photo collection;
- iv. parents and grandparents appear with their children or grandchildren;
- v. friends and relatives are clustered across photos;
- vi. an acquaintance appears in fewer images than relatives and friends; and
- vii. people with closer relationships appear closer in photos than those who do not have a close relationship.

10. The method of claim 7 wherein the inference is performed using a Markov Logic Network (MLN).

11. The method of claim 7 further comprising one or more of the following:
- d. adding additional new images to the image collection; or
- e. identifying new individuals in the new images.

12. The method of claim 11 further including
- f. using the identified new individuals, their occurrences and co-occurrences, their gender, and their age ranges to infer social relationships between the new individuals and the assumed owner of the photo collection based on the set of rules.

* * * * *